United States Patent [19]
Lewis et al.

[11] 3,796,833
[45] Mar. 12, 1974

[54] TIME DIVISION COMMUNICATION SYSTEM

[75] Inventors: Theras Gordon Lewis; John Francis O'Neill, both of Boulder, Colo.

[73] Assignee: Bell Telephone Laboratories, Incorporated, Murray Hill, Berkeley Heights, N.J.

[22] Filed: July 31, 1972

[21] Appl. No.: 276,897

[52] U.S. Cl....... 179/15 AT, 179/15 A, 179/18 BC, 179/15 AQ
[51] Int. Cl............................................... H04j 3/02
[58] Field of Search...... 179/15 AA, 15 AQ, 15 AT, 179/15 A, 1C N, 18 BC

[56] References Cited

UNITED STATES PATENTS

| | | | |
|---|---|---|---|
| 3,745,256 | 7/1973 | Carbrey | 179/15 AA |
| 3,742,147 | 6/1973 | Carbrey | 179/15 AT |
| 3,745,253 | 7/1973 | Carbrey | 179/15 AT |

*Primary Examiner*—Kathleen H. Claffy
*Assistant Examiner*—Thomas D'Amico
*Attorney, Agent, or Firm*—J. S. Cubert

[57] ABSTRACT

A time division communication system wherein a plurality of time slots occurs in repetitive cycles includes a plurality of storage devices, first and second buses, a control signal source and a summing amplifier connected between the first and second bus. Each storage device has an associated circuit responsive to the control signal to apply the signal in the storage device to the first bus and to generate a signal corresponding to the difference between a signal received from the second bus and the storage device signal. The generated signal is stored and a signal corresponding to the stored generated signal is applied to the associated storage device. During a distinct time slot, the control signal is applied to selected storage device circuits; the storage device signals on the first bus are summed in the summing amplifier; and the summing amplifier output is applied to the second bus whereby signals are exchanged among the selected storage devices.

19 Claims, 7 Drawing Figures

TIME DIVISION COMMUNICATION SYSTEM

BACKGROUND OF THE INVENTION

Our invention relates to communication systems and more particularly to information transfer arrangements in a time division communication system.

Time division communication systems permit a plurality of concurrent information exchanges over a common communication link. Each exchange is assigned to a particular time slot of a repetitive group of time slots. During the repetitive time slot group, a plurality of information sample exchanges are sequentially completed over the common link. In one such time slot, the information from each line assigned to the connection in the time slot is sampled and the sample is transferred to the other assigned lines via the common link. The common link is available to other line connections during the remaining time slots of the repetitive time slot cycle. As is well known in the art, the sampling rate for the line connections may be selected to provide an accurate information transfer between selectively interconnected lines. Where the sampling rate is periodic and greater than twice the highest frequency to be transferred, the signal transmission may be without loss.

In some prior art time division communication systems, a resonant transfer between a pair of line associated storage devices is utilized to accomplish the information exchange in a distinct time slot. This type of transfer requires a relatively precise network for the information exchange which network includes the line associated storage capacitors and inductive elements specially selected for precisely timed signal transfers. Since the energy exchanged in each time slot is limited to a small time sample of the signal, a relatively large amount of power is needed for each exchange and only a small portion of the energy transferred by means of resonant transfer lies within the desired frequency range. Thus, the electronic switches interconnecting the selected lines in a time slot must have very low losses and must be precisely timed. Additionally, the conversion of the exchanged information from sampled form to analog signals requires a complex filter associated with each line storage device to provide maximum transfer of the limited energy available in the desired band.

In other time division signal transfer systems, a sample signal from a storage device is transferred directly to a second storage device wherefrom the stored sample is made available for an extended period of time. This sample and hold switching arrangement provides a larger signal component in the desired band so that the filter requirements are simplified and, further, inductive elements are eliminated in the transfer network. But, the sample and hold technique has generally required at least two successive time intervals to complete the signal transfer between a pair of lines. Other forms of sample and hold time division transfer systems such as illustrated in the copending application Ser. No. 224,780 filed Feb. 9, 1972 and assigned to the same assignee provide a signal transfer between a pair of lines on a time division basis in a single time interval. These arrangements, however, require the use of three or more time division buses and are limited to signal transfers between a pair of lines in each time slot.

BRIEF SUMMARY OF THE INVENTION

Our invention is a time division communication system for exchanging signals among selected paths of a plurality of communication paths in a distinct time slot of a plurality of time slots occurring in repetitive cycles. The time division communication system includes first and second common buses, a coupling circuit connected between the common buses, and a control signal source. Each communication path has an associated circuit including a storage device connected between the path and the first and second common buses. In response to a control signal applied to each selected communication path circuit in the distinct time slot, the signal in the communication path circuit storage device is coupled to the first bus and a first signal is generated corresponding to the difference between a signal applied to the circuit from the second common bus and the storage device signal. The first signal is stored and a second signal responsive to the stored first signal is applied to the storage device. The signals on the first bus from the selected communication path storage devices are summed in the coupling circuit and the resulting sum signal is applied to the second bus wherefrom it is applied to each selected path circuit.

According to one aspect of the invention, the first signal generating means comprises an amplifying device having first and second inputs and first and second outputs. The second bus signal is applied to the first input and the storage device signal is applied to the second input. The amplifier is operative responsive to the second bus signal and the storage device signal to provide a difference signal of one phase on the first output and a difference signal of the opposite phase on the second output. The one phase difference signal is placed in a first store and the opposite phase difference signal is placed in a second store. In the interval between the successive occurrences of the distinct time slot, a first type signal responsive to the one phase difference signal is generated and applied to the storage device and a second type signal responsive to the opposite phase difference signal is generated and applied to the storage device whereby the storage device receives the difference between the sum signal and the signal from the connected storage device. The resulting average signal in the storage device is the sum of the signals from the other selected communication path circuits.

According to another aspect of the invention, the storage device comprises a storage capacitor having two terminals. The first type signal is a current signal corresponding to the amplitude of the one phase difference signal and the second type signal is a signal corresponding to the amplitude of the opposite phase difference signal. In this manner, the average value of the signal transferred to the communication path from the storage capacitor during the interval between successive time slots corresponds to the sum of the signals from all other selected communication path storage capacitors.

According to another aspect of the invention, the control signal source comprises a control circuit and a plurality of local recirculating shift registers. Each local register provides the control signal to the communication path circuit connected thereto. A code is transferred from the control circuit to each local register associated with the connection in the distinct time slot. The local register recirculates the code once each repetitive cycle and responsive to the recirculated code, a control signal is applied to the connected storage device circuit in the distinct time slot of each repetitive cycle.

According to another aspect of the invention, the time division communication system further includes a third time division bus to which the control signal from each local register is applied and which is further connected to the control circuit. In the event a new call connection is requested, the occurrence of a time slot in which no control signal is applied to the third common bus is marked whereby an idle slot is found and assigned to the new call connection. A control code is then applied from the control circuit to the local registers associated with the communication paths of the new call connection in the assigned time slot whereby signal transfers between said communication paths are commenced in the assigned time slot.

In an embodiment illustrative of our invention, each communication path circuit includes a storage capacitor having two terminals, a difference amplifier with first and second inputs and first and second outputs, first and second capacitor stores, a positive current generator and a negative current generator. A first switch and a coupling impedance are serially connected from one terminal of the storage capacitor to the first common bus. The storage capacitor one terminal is also connected to the difference amplifier first input and the second common bus is connected to the difference amplifier second input. The difference amplifier is operative to produce a first signal corresponding to the difference between the storage capacitor signal and the signal on the second bus at the first output and a second signal corresponding to the difference between the signal on the second common bus and the storage capacitor signal at the second output. The first store is connected to the first amplifier output via a second switch and the second store is connected to the second amplifier output via a third switch. In response to the control signal applied to each selected communication path circuit during the distinct time slot, the first, second and third switches are closed whereby the storage capacitor signal is coupled to the first common bus; the first difference signal is applied to the first store; and the second difference signal is applied to the second store. The positive current generator is responsive to the amplitude of the first difference signal in the first store to apply a current signal to the one terminal of the storage capacitor and the negative current generator is similarly responsive to the second difference signal to apply a current signal to the one terminal of the storage capacitor during the interval between successive distinct time slots. A summing amplifier connected from the first common bus to the second common bus receives the coupled storage capacitor signals from all selected communication path circuits and applies the sum of said coupled storage capacitor signals to the second common bus during the distinct time slot. The average value of the resulting signal placed in the storage capacitor of each selected circuit and coupled therefrom to the connected communication path during the interval between successive distinct time slots is the sum of all other selected communication path signals. The signal from the connected communication path is placed in the storage capacitor in each distinct time slot which signal is transferred to the other selected communication path circuits in the next distinct time slot.

DETAILED DESCRIPTION

Figure 1A:
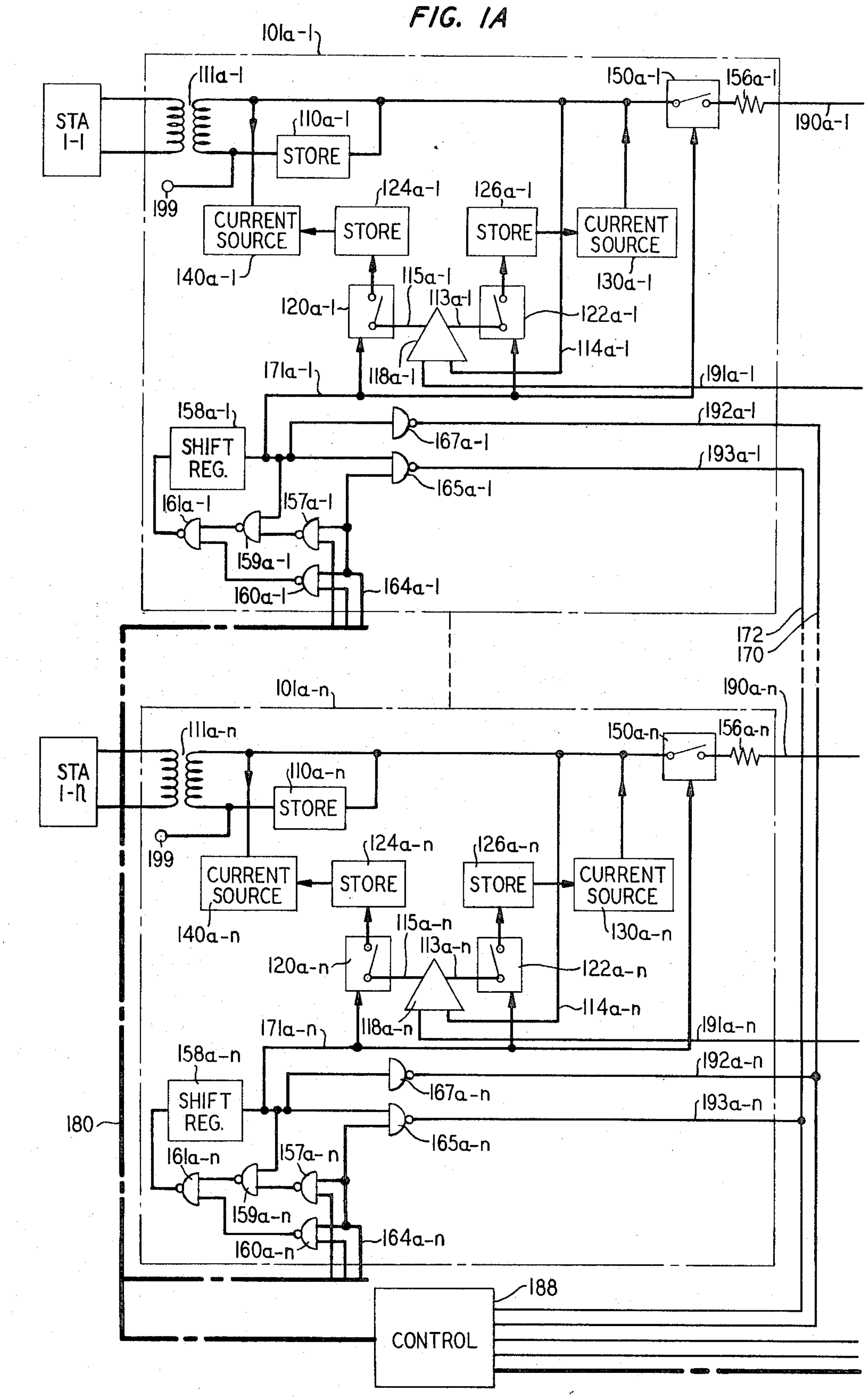
FIGS. 1A and 1B depict a time division switching system illustrative of the invention.
Figure 1B:
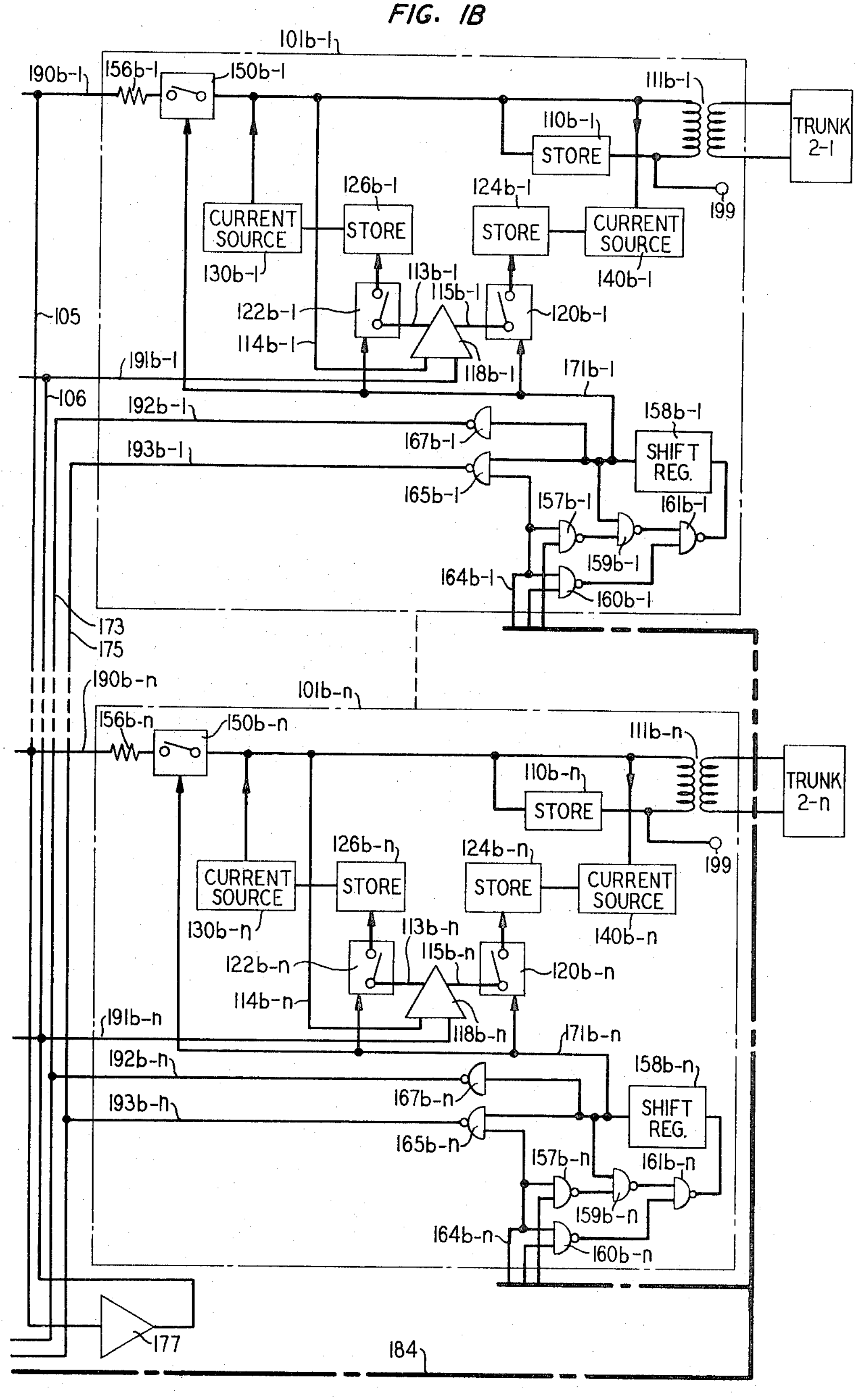

FIGS. 1A and 1B show a time division communication system serving stations 1—1 through **1–*n* and trunks 2-1 through 2–*n* which includes common buses 105 and 106, summing amplifier 177 connected from bus 105 to bus 106, and control 188. Stations 1—1 through 1–*n* are connected to common buses 105 and 106 via associated station circuits 101*a*–1 through 101*a*–*n*. Trunks 2-1 through 2–*n* are connected to buses 105 and 106 via trunk circuits 101*b*-1 through 101*b*–*n*. Station circuit 101*a*–1, by way of example, includes store 110*a*–1 which receives outgoing signals from station 1—1 via transformer 111*a*–1. The station outgoing signal stored in store 110*a*–1 is transferred to outgoing time division bus 105 via normally open switch 150*a*–1 and coupling impedance 156*a*–1** during a selected time slot.

The signal from incoming time division bus 106 during the selected time slot is applied via lead **191*a*–1 to one input of difference amplifier 118*a*–1 and the station signal stored in store 110*a*–1 is applied to the other input of difference amplifier 118*a*–1 via lead 114*a*–1. The amplifier is operative to provide a first output signal on lead 113*a*–1 corresponding to the difference between the signal applied via lead 191*a*–1 and the stored station signal applied via lead 114*a*–1. A second output signal is obtained on lead 115*a*–1 which is identical to that on lead 113*a*–1 but of opposite phase. During the selected time slot, switches 120*a*–1 and 122*a*–1 are closed whereby the output signals from amplifier 118*a*–1 are applied to stores 124*a*–1 and 126*a*–1**.

In the interval between selected time slots, the signal in store **126*a*–1 controls current source 130*a*–1 so that a current signal is applied to one terminal of store 110*a*–1. This current signal corresponds to the amplitude of the signal placed in store 126*a*–1. Similarly, the signal in store 124*a*–1 controls current source 140*a*–1 so that an opposite polarity current signal is applied to the same terminal of store 110*a*–1. The other terminal of store 110*a*–1 is connected to reference voltage source 199. Current sources 130*a*–1 and 140*a*–1 are operative in the interval between successive selected time slots to apply signals to store 110*a*–1 corresponding to the difference between the inputs on amplifier 118*a*–1. During the interval between selected time slots, the signal derived from current sources 130*a*–1 and 140*a*–1 is combined with the station outgoing signal in store 110*a*–1 whereby the average of the resultant signal in store 110*a*–1 over the interval between distinct time slots is the signal from bus 106. This signal on store 110***a*–1 is transferred via transformer 111*a*–1 to station 1—1. This is so because station 1—1 provides a properly matched termination for the signal transferred thereto. The outgoing signal from station 1—1 is transferred to store 110*a*–1 during each distinct time slot.

Shift register 158*a*–1 and associated gates 159*a*–1, 161*a*–1, 163*a*–1, 165*a*–1 and 167*a*–1 provide a control arrangement which among other functions controls the operation of switches 120*a*–1, 122*a*–1 and 150*a*–1 so that these switches are closed only in the selected time slot. The other station circuits 101*a*–2 (not shown) through 101*a*–*n* operate in a similar manner to selectively transfer signals between stations 1–2 through 1–*n* and common buses 105 and 106. Trunk circuits 101*b*–1 through 101*b*–*n* operate in a similar manner to serve trunks 2–1 through 2–*n*.

Assume for purposes of illustration that station 1—1, station 1–*n* and trunk 2–1 are connected together in time slot ts2. This connection requires that shift registers 158*a*–1, 158*a*–*n* and 158*b*–1 provide output signals on leads 171*a*–1, 171*a*–*n* and 171*b*–1 respectively during time slot ts2. The output on lead 171*a*–1 is shown in waveform 301 of FIG. 3. The output on lead 171*a*–*n* is shown on waveform 303 and the output on lead 171*b*–1 is shown in waveform 305. Assume further that at the beginning of time slot ts2 shown on FIG. 3, store 110*a*–1 contains signal *ea*–1, store 110*a*–*n* contains signal *ea*–*n* and store 110*b*–1 contains signal *eb*–1. Signals *ea*–1, *ea*–*n* and *eb*–*n* are the outgoing signals from station 1—1, station 1–*n* and trunk 2–1, respectively. The signal *ea*–1 is applied from one terminal of store 110*a*–1 via switch 150*a*–1, coupling impedance 156*a*–1 and lead 190*a*–1 to common bus 105. Similarly, the signal *ea*–*n* is applied from store 110*a*–*n* via switch 150*a*–*n*, coupling impedance 156*a*–*n* and lead 190*a*–*n* to common bus 105; and signal *eb*–1 is applied from store 110*b*–1 via switch 150*b*–1, coupling impedance 156*b*–1 and lead 190*b*–1 to common bus 105. Amplifer 177 is operative to sum the station and trunk outgoing signals coupled to bus 105 so that the signal [(*ea*–1/2) + (*ea*–*n*/2) + (*eb*–1/2)] is returned to the selected trunk and station circuits via common bus 106.

Referring to circuit 101*b*–1 on FIG. 1*b*, the sum signal from bus 106 is applied via lead 191*b*–1 to one input of difference amplifier 118*b*–1 in circuit 101*b*–1. The other input to difference amplifier 118*b*–1 receives the signal *eb*–1 from store 110*b*–1 via lead 114*b*–1. In response to these input signals, an output signal corresponding to the sum signal less the station signal appears on 115*b*–1 and is applied via closed switch 122*b*–1 to store 126*b*–1. The output signal appearing on lead 113*b*–1 corresponds to the station signal less the sum signal and this signal is applied to store 124*b*–1 via switch 120*b*–1. At the end of time slot ts2, switches 120*b*–1, 122*b*–1 and 150*b*–1 in circuit 101*b*–1 are opened responsive to the output of shift register 158*b*–1 on lead 171*b*–1. In this manner, store 110*b*–1 is disconnected from common bus 105, and stores 124*b*–1 and 126*b*–1 are disconnected from difference amplifier 118*b*–1.

Current source 130*b*–1 is responsive to the signal in store 126*b*–1 to apply a current signal to one terminal of store 110*b*–1. Current source 140*b*–1 is responsive to the signal stored in store 124*b*–1 to apply an equal but opposite polarity current signal to the same terminal of store 110*b*–1. The currents supplied to store 110*b*–1 from sources 130*b*–1 and 140*b*–1 provide a signal across store 110*b*–1 which is combined with the outgoing signal from trunk 2–1 so that a varying signal voltage appears across store 110*b*–1 in the interval between successive ts2 time slots. Transformer 111*b*–1 is terminated by the impedance of the connected trunk whereby the combined signal voltage across store 110*b*–1 is transferred to trunk 2–1 during the interval between successive ts2 time slots. Stores 124*b*–1, 126*b*–1, the current sources and store 110*b*–1 are arranged so that the average of the combined signal voltage transferred to trunk 2–1 over the period between successive ts2 time slots corresponds to the sum of the signals from station 1—1 and 1–*n*. The outgoing signal *eb*–1 from trunk 2–1 is also transferred via transformer 111*b*–1 to store 110*b*–1 during the distinct time slots and therefrom to bus 105. In this manner, trunk 2–1 receives the signals only from the other stations while the outgoing signal from this trunk is applied to store 110*b*–1 of circuit 101*b*–1 in the ts2 time slots.

The operations of circuit 101a-1 serving station 1—1 and circuit 101*a*–*n* serving station 1–*n* are substantially similar to that discussed with respect to circuit 101*b*–1. Store 110*a*–1 receives current signals from sources 130*a*–1 and 140*a*–1 during the interval between successive ts2 time slots in response to the operation of amplifier 118*a*–1 and the resulting signal in store 110*a*–1 is transferred to station 1—1 during that interval. The average value of the signal transferred to station 1—1 corresponds to (*ea*–*n* + *eb*–1). The outgoing signal *ea*–1 from station 1—1 is applied to store 110*a*–1 during each ts1 time slot. Store 110*a*–*n* in circuit 101*a*–*n* receives a current signal from sources 130*a*–*n* and 140*a*–*n* during the subject time interval in response to the operation of amplifier 118*a*–*n* and the resulting signal in store 110*a*–*n* is transferred to station 1–*n*. The average value of the transferred signal corresponds to (*ea*–1 + *eb*–1). The outgoing signal *ea*–*n* from station 1–*n* is applied to store 110*a*–*n* in each ts2 time slot. At the beginning of the next occurring ts2 time slot, store 110*a*–1 has a new sample of outgoing signal *ea*–1, store 110*a*–*n* has a new sample of the signal *ea*–*n* and store 110*b*–1 has a new sample of the signal *eb*–1. In this manner, signals are exchanged among the connected communication path station 1—1, station 1–*n* and trunk 2–1 via the time division arrangement shown in FIGS. 1A and 1B.

When a request for a call connection between a plurality of stations and trunks is made, a call request code is stored in control 188 on FIG. 1A and an idle time slot is selected for the connection. This is done in FIGS. 1A and 1B by inspecting the outputs of all station circuit shift registers in common bus 170 and by inspecting the outputs of all trunk circuit shift registers on common bus 173. Thus, during each time slot of one repetitive cycle, the output of shift register 158*a*–1 is applied to common bus 170 via NAND gate 167*a*–1 and lead 192*a*–1. At the same time the outputs of shift registers 158*a*–2 through 158*a*–*n* are applied to bus 170 via NAND gates 167*a*–2 through 167*a*–*n*, respectively. The output of shift register 158*b*–1 is applied to common bus 173 via NAND gate 167*b*–1 and similarly the outputs of shift registers 158*b*–2 through 158*b*–*n* are applied to bus 173 via NAND gates 167*b*–2 through gate 167*b*–*n*, respectively. Where none of the station shift registers has an output signal during a particular time slot, a signal indicating that the time slot is idle with respect to all stations is applied to control 188. In like manner, if none of the shift registers associated with the trunk circuits produces an output in the particular time slot, the output on common bus 175 to control 188 shows that the particular time slot is idle with respect to trunk circuits. When both buses 170 and 173 indicate an idle time slot, control 188 marks the time slot for the requested call connection.

Assume for purposes of illustration that the requested call connection is to be made between stations 1—1, 1–*n* and trunk 2–1. During a subsequent repetitive cycle, a signal is applied from control 188 via cable 180 to NAND gates 159*a*–1 and 159*a*–*n*. The signal to gate 159*a*–1 is supplied via NAND gate 157*a*–1 which selects registers 158*a*–1 through the select signal on lead 164*a*–1. The signal to gate 159*a*–*n* is supplied in a similiar manner. This signal has a duration of one repetitive cycle and disables gates 159a–1 and 159*a*–*n* to prevent the outputs of shift registers 158*a*–1 and shift register 158*a*–*n* from recirculating any signal therein thus clearing the registers. Similarly, a signal is applied from control 188 via cable 184 to NAND gate 159*b*–1 in trunk circuit 101*b*–1, to clear shift register 158*b*–1. The select signal on lead 164*b*–1 is used to activate gate 157*a*–1 and 159*a*–1.

In a subsequent occurrence of the selected time slot ts2, another control signal and select signals from control 188 are applied via cable 180 to NAND gates 160*a*–1 and 160*a*–*n*. The control and select signals enable gates 160*a*–1 and 160*a*–*n* which in turn open gates 161*a*–1 and 161*a*–*n* so that a pulse is inserted for the duration of time slot ts2 in each of shift registers 158*a*–1 and 158*a*–*n*. This pulse is continuously recirculated once every repetitive cycle and is operative to control the signal transfer operation in that time slot. In like manner, control and select signals are applied from control 188 via cable 184 to gate 160*b*–1 in trunk circuit 101*b*–1 so that gate 161*b*–1 is opened and a pulse is inserted into shift register 158*b*–1 for the duration of time slot ts2. This pulse is recirculated once every repetitive cycle in shift register 158*b*–1.

Upon a request to add a new station or a new trunk to an already established call connection, the time slot of the established call connection must be identified. In the arrangement shown on FIGS. 1A and 1B, this is done by determining the time slot already used by a station or a trunk in the established call connection. Thus control 188 may send a select code via cable 180 to gate 165*a*–1 in station circuit 101*a*–1 enabling gate 165*a*–1 so that the output of shift register 158*a*–1 is applied to bus 172 in the time slot stored in register 158*c*–1. This output occurs in time slot ts2 which is the time slot of the established connection. The output is applied via common bus 172 to control 188 whereby the time slot of the established call connection is identified through the station circuit shift register. It is to be understood, however, that any station or trunk in the established call connection may be used to identify the time slot for the addition of another party. If a trunk circuit such as trunk circuit 101*b*–1 is used for the identification, gate 165b-1 is selected by a select code from control 188 via cable 184 and the output of register 158*b*–1 is applied to common bus 175 to determine the time slot in which the established call connection is assigned. The output of common bus 175 is returned to control 188 whereby the identification is made and the new party may be added to the existing call connection through the control arrangement including the shift register associated with the new party circuit.

Figures 2, 3, 4A, 4B, 5:
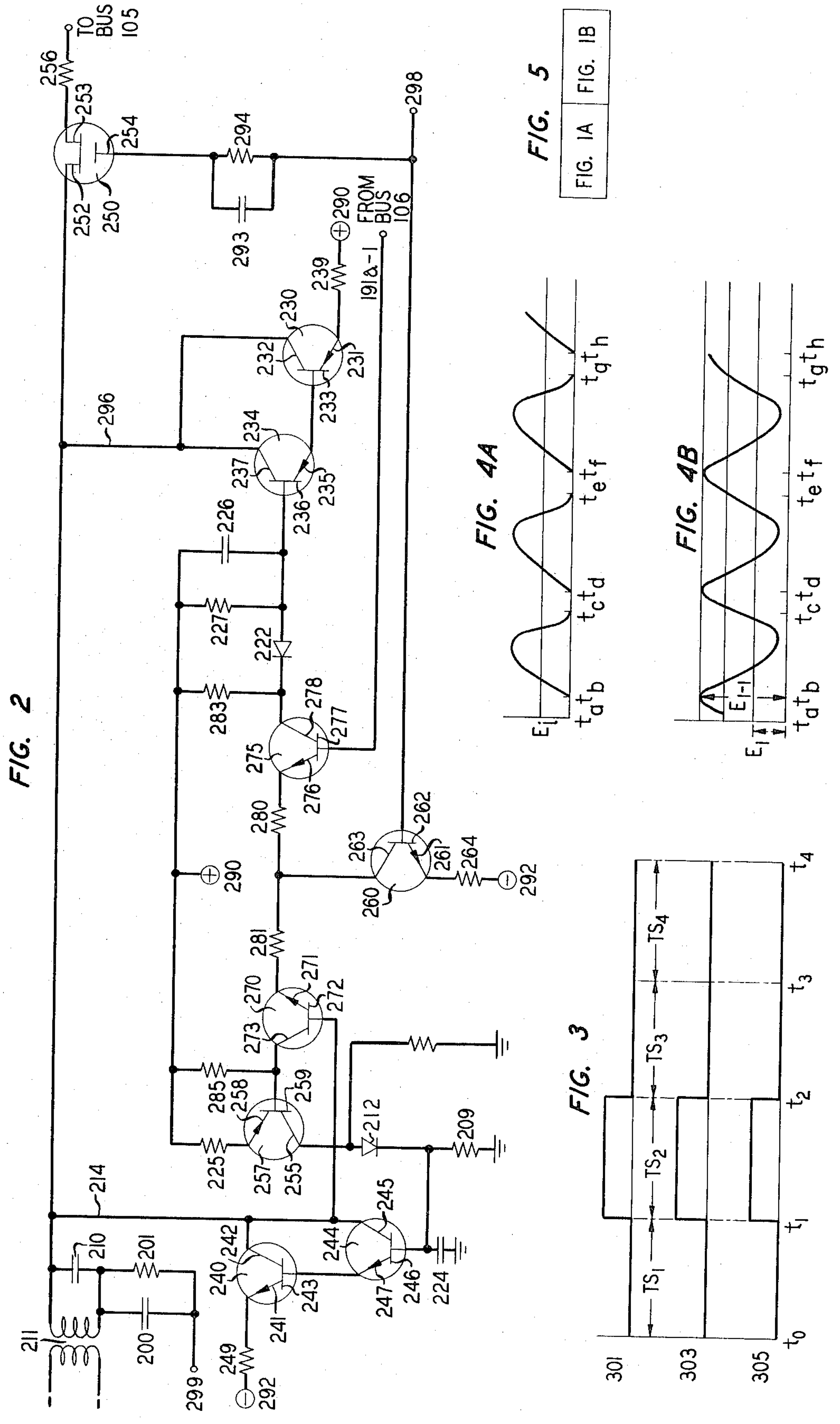
FIG. 2 shows a schematic diagram of a communication path circuit useful in the time division switching system depicted in FIG. 1.
FIG. 3 shows timing waveforms useful in describing the time division switching system depicted in FIG. 1.
FIGS. 4A and 4B show waveforms useful in describing the operation of the communication path circuit of FIG. 2.
FIG. 5 shows the arrangement of FIGS. 1A and 1B.

FIG. 2 shows a circuit diagram of the signal transfer arrangement which may be used in each station and trunk circuit of FIG. 1A and FIG. 1B. The circuit of FIG. 2 may, for example, be the signal transfer arrangement in station circuit 101*a*–1. Amplifier 118*a*–1 then corresponds to the amplifier circuit including transistors 270, 275 and 260. Store 126*a*–1 corresponds to capacitor 226 and resistor 227 and store 124*a*–1 corresponds to capacitor 224 and resistor 209. Current source 130*a*–1 corresponds to the circuit arrangement including transistors 234 and 230 and resistor 239. Current source 140*a*–1 corresponds to the circuit including transistors 244 and 240 and resistor 249. Store 110*a*–1 corresponds to capacitor 210, transformer 111*a*–1 corresponds to transformer 211, switch 150*a*–1 corresponds to IGFET device 250, switch 122*a*–1 corresponds to diode 222 and switch 120*a*–1 corresponds to the circuit arrangement including transistor 257 and diode 212. Bias voltage source 299 is connected to transformer 211 via resistor 201 and capacitor 200 to provide a d.c. reference voltage for the operation of storage capacitor 210.

Referring to the amplifier corresponding to the amplifier 118*a*–1 in FIG. 2 transistors 270, 275 and 260 are npn transistors well known in the art, and the amplifier circuit is a differential amplifier also well known in the art. Collector 273 of transistor 270 is connected to positive voltage source 290 via resistor 285. Emitter 271 is connected to collector 263 via resistor 281 and emitter 261 is connected to negative voltage source 292 via resistor 264. Similarly, collector 275 is connected to positive voltage source 290 via resistor 283 and emitter 276 is connected to collector 263 via resistor 280. During the selected time slot ts2, a positive going signal is applied from shift register 158*a*–1 to base electrode 262 of transistor 260 via lead 298 whereby transistor 260 is rendered conductive. In this way, transistors 270 and 275 are biased in their linear range of operation and transistor 260 operates as a current source to provide a high impedance path from the junction between resistors 280 and 281 and negative source 292. In this manner, the amplifier arrangement including transistors 270 and 275 is rendered operative as a differential amplifier only during selected time slots. The values of the resistors associated with these transistors are selected so that the amplifier has a gain of 2. It is to be understood that other resistor values may be selected and that the circuit may be used with gain other than that of 2.

In the selected time slot ts2, the d.c. voltage at collector 278 is such that diode 222 is rendered conductive and the d.c. voltage at collector 273 is such that pnp transistor 257 and diode 212 are also conductive. Thus the output voltage from collector 278 is applied to capacitor 226 via conducting diode 222 and the output from collector 273 is applied to capacitor 224 via transistor 257 and conducting diode 212.

During the distinct time slot, signal *ea*–1 from station 1—1 is applied to capacitor 210 via transformer 211 and is stored therein. The positive going signal on lead 298 is applied via the pulse shaping network including resistor 294 and capacitor 293 to gate 254 of IGFET device 250. This positive going signal turns IGFET 250 on whereby there is a conductive bidirectional path between drain electrode 253 and source electrode 252. The signal *ea*–1 on capacitor 210 is transmitted to bus 105 via conducting IGFET device 250, coupling impedance 256 and lead 190*a*–1. Since station circuit 101*a*–*n* and trunk circuit 101*b*–1 are enabled during time slot ts2. the signals from these circuits are also applied to bus 105. Thus, the output of amplifier 177 on FIG. 1B during time slot ts2 is *ea*–1 + *ea*–*n* + *eb*–1 and the signal returned from bus 106 to base 271 of transistor 275 via lead 191*a*–1 is [ea–1/2 + *ea*–*n*/2 – eb–1/2]. The attenuation of the sum signal returned to base 277 occurs because of the impedance matching in the signal transfer network. The output of capacitor 210 is also applied to base 272 of transistor 270 via lead 214. In accordance with the well known principles of differential amplifier operation, the resulting voltage on collector 278 during time slot ts2 is $$V_q - 2\,[ea-1/2\,;\, ea-n/2 + eb-1/2 - ea-1] \quad (1)$$

$$= V_q - (ea-n + eb-1 - ea-1). \quad (2)$$

The voltage on collector 273 is $$V_q + 2[(ea-1/2) + (ea-n/2) + (eb-1/2) - ea-1)] \quad (3)$$

$$= V_q + (ea-n + eb-1 - ea-1). \quad (4)$$

$V_q$ is the quiescent d.c. operating voltage on each of collectors 273 and 278. As hereinbefore mentioned there is a conductive path from collector 278 to capacitor 226 via diode 222 whereby the voltage on collector 278 is transmitted to capacitor 226. Similarly, the voltage on collector 273 is transmitted to capacitor 224 via transistor 257 and diode 212.

When time slot ts2 is terminated, the control voltage applied to lead 298 becomes sufficiently negative so that transistor 260 is rendered nonconductive and IGFET device 250 is turned off. No current flows through transistors 270 and 275 because transistor 260 is nonconductive and the voltage on collector 278 becomes substantially that of positive voltage source 290 whereby diode 222 is rendered nonconductive. Similarly, the voltage at collector 273 is substantially that of positive voltage source 290 so that transistor 257 and diode 212 become nonconductive. Capacitor 226 retains the voltage transferred thereto from collector 278 during time slot ts2 and capacitor 224 retains the voltage transferred thereto from collector 273 during time slot ts2.

During the interval between successive occurrences of time slot ts2, the voltage on capacitor 226 is applied to base 236 whereby transistors 234 and 233 are rendered conductive. Pnp transistors 234 and 233 are connected as a Darlington pair well known in the art so that the output from collectors 232 and 237 are combined and a positive current is applied to capacitor 210. This current is determined by the value of resistor 239 and the voltage on base 236. The gain of the Darlington pair including transistors 234 and 233 is sufficiently high so that substantially no current flows from base 236 into capacitor 226 in the time interval between ts2 time slots. Capacitor 226 is discharged through resistor 227. The value of resistor 227 is selected so that this discharge is completed in approximately one-half the aforementioned time interval. The voltage controlling the operation of the positive current source from capacitor 226 is $$[V_q - (ea-n + eb-1 - ea-1)]\, e - t/R_1c_1. \quad (5)$$

$R_1$ is the value of resistor 227 and $c_1$ is the value of capacitor 226.

In a similar manner, the voltage stored on capacitor 224 is applied to base 246 of transistor 244. Npn transistors 244 and 240 are connected in a Darlington arrangement to obtain high gain and the outputs of collectors 245 and 243 are combined whereby a negative current is applied to capacitor 210. The gain of the Darlington arrangement including transistors 240 and 244 is such that substantially no current flows from base 246 into capacitor 224 in the subject time interval. Capacitor 224 is discharged through resistor 209. The value of resistor 209 is selected so that the discharge of capacitor 226 is completed in approximately one-half the subject time interval. The voltage controlling the operation of the negative current source is the voltage on capacitor 224 and is given by $$[V_q + (ea-n + eb-1 - ea-1)]\, e - t/R_1c_1. \quad (6)$$

$R_1$ is the value of resistor 209 and $c_1$ is the value of capacitor 224. The sum of the currents from the positive current source and the negative current source is applied to capacitor 210 via leads 296 and 214. At the end of the last occurring ts2 time slot, capacitor 210 has a voltage thereon equal to the signal voltage ea-1 transferred thereto. Since the impedance across capacitor 210 from transformer 211 is the properly matched station impedance, the values of resistors 239, 249 and resistors 227 and 209 as well as capacitors 224, 226 and 210 may be advantageously selected so that the average value of the signal voltage across capacitor 210 over the time interval between successive ts2 time slots is equal to *ea*–*n* + *eb*–1. This signal voltage which is the sum of the signal voltages from the other stations in the established call connection is transferred from capacitor 210 to the connected station via transformer 211 during the interval between successive ts2 time slots. In this way the outgoing signal from the station connected to capacitor 210 is transferred to bus 105 during the selected time slot ts2 and the sum of the signals from the other connected stations is transferred from capacitor 210 to the connected station in the time interval between successive occurrences of time slot ts2.

FIG. 4A shows the voltage waveform across capacitor 210 in FIG. 2 in a call connection where the station connected to the station circuit of FIG. 2 is not producing a signal voltage and signals from other station and trunk circuits in the connection are sent to the station circuit of FIG. 2 over lead 191*a*–1. The selected time slots for the connection occur between times *ta* and *tb*, *tc* and *td*, *te* and *tf*, and *tg* and *th* in FIG. 4A. Since the output of the connected station is zero, the signal across capacitor 210 during the selected time slots is also zero. This is insured by the selection of the RC time constants in the circuit of FIG. 2.

In the selected time slot, for example between ta and *tb*, the signal from lead 191*a*–1 is applied to base 271 of transistor 275 and signals corresponding to the incoming signal are stored on capacitors 226 and 224 as hereinbefore described. At time *tb*, capacitors 226 and 224 are disconnected from collectors 278 and 273; the positive current source including transistors 230 and 234 and negative current source including transistors 240 and 244 apply currents to capacitor 210 responsive to the stored incoming signal. The time constants of the circuit of FIG. 2 are arranged such that the signal on capacitor 210 at time tc is zero. During the time interval between times tb and tc, the signal voltage across capacitor 210 is transferred to the connected station via transformer 211. Since transformer 211 is properly terminated by the connected station, the average of the signal voltages shown in FIG. 4A is E1 as indicated in FIG. 4A; and this average voltage E1 corresponds to the incoming signal from lead 191*a*–1.

FIG. 4B shows the waveform across capacitor 210 during an established call connection where the station connected to the station circuit of FIG. 2 provides a signal voltage having a peak value of E1–1 and the other participating stations and trunks provide zero signals. At the end of each selected time slot, the voltage across capacitor 210 is E1–1 because of the transfer from the connected station. This is shown at times *ta*, *tc*, *te* and *tg* in FIG. 4B. During each selected time slot, for example between *ta* and *tb*, the signal from the connected station is applied to base 272 of transistor 270 via lead 214, and in accordance with the foregoing description, signal voltages corresponding to the station outgoing signal are stored in capacitors 224 and 226. Between times *tb* and *tc*, the current sources of FIG. 2 are operative so that the signal voltage on capacitor 210 varies as is shown in FIG. 4B. In accordance with the selected time constants of the station circuit of FIG. 2, the average value of the voltage across capacitor 210 is E1 and this voltage is equal to E1–½ so that half the signal voltage appears across capacitor 210 and is transferred therefrom to the other stations and trunks in the call connection. Since on the average one-half the signal voltage from the connected station appears across capacitor 210, the station is properly terminated. Where all stations and trunks of the established call connection provide signal voltages, the desired signal exchange occurs with properly matched conditions for the stations and trunks in the call connection since the waveforms of FIG. 4A and FIG. 4B may be linearly combined by superposition.

What is claimed is:

1. In a time division communication system wherein a plurality of time slots occurs in repetitive cycles, a circuit for coupling signals between an incoming time division bus, an outgoing time division bus and a communication path comprising apparatus operative in a distinct time slot including means for receiving an outgoing signal from said communication path, first means for storing said received outgoing signal, means for applying said stored outgoing signal to said outgoing time division bus, means for coupling said outgoing time division bus to said incoming time division bus, means for receiving the signal appearing on said incoming time division bus, means responsive to said received incoming signal and said stored outgoing signal for generating a signal corresponding to the difference between the received incoming signal and the stored outgoing signal from said first storing means, and second means for storing said generated signal, and apparatus operative in the time interval between successively occurring distinct time slots comprising means responsive to said stored generated signal for producing and applying a distinct signal to said first storing means and means for applying the signal in said first storing means to said communication path.

2. In a time division communication system wherein a plurality of time slots occurs in repetitive cycles, a circuit according to claim 1 wherein said second storing means comprises second and third storage devices, said signal generating means comprises amplifying means having first and second inputs and first and second outputs, means for applying said stored outgoing signal to said first input, means for applying said received incoming signal to said second input, said amplifying means being operative in said distinct time slot to produce a first signal corresponding to said received incoming signal less said stored outgoing signal on said first output and to produce a second signal corresponding to said stored outgoing signal less said received incoming signal on said second output, means for applying said first signal to said second storage device and means for applying said second signal to said third storage device, and wherein said distinct signal producing and applying means comprises means responsive to said stored first signal for producing and applying a third signal to said first storing means, and means responsive to said stored second signal for producing and applying a fourth signal to said first storing means.

3. In a time division communication system wherein a plurality of time slots occurs in repetitive cycles, a circuit according to claim 2 wherein said first signal applying means comprises switching means connected between said first output and said second storage device operative in said distinct time slot for connecting said first output to said second storage device, and said second signal applying means comprises switching means connected between said second output and said third storage device operative in said distinct time slot for connecting said second output to said third storage device.

4. In a time division communication system wherein a plurality of time slots occurs in repetitive cycles, a circuit according to claim 3 wherein said third signal producing and applying means comprises first type current generating means and said fourth signal producing and applying means comprises second type current generating means.

5. In a time division communication system wherein a plurality of time slots occurs in repetitive cycles, a circuit according to claim 4 wherein said first storing means comprises a first storage capacitor, said second storage device comprises a second storage capacitor and said third storage device comprises a third storage capacitor.

6. In a time division communication system wherein a plurality of time slots occurs in repetitive cycles, a circuit according to claim 5, wherein said first type generating means comprises a positive current generating circuit and said second type generating means comprises a negative current generating circuit.

7. A time division communication system wherein a plurality of time slots occurs in repetitive cycles comprising a plurality of communication path storage devices, first and second common buses, a control signal source, each storage device having an associated circuit comprising means responsive to a control signal from said source for applying a signal from said path storage device to said first common bus, means for receiving a signal from said second common bus, means connected to said receiving means and to said storage device responsive to said control signal for generating a signal corresponding to the difference between said received signal and said storage device signal, means connected to said generating means responsive to said control signal for storing said generated signal, means connected between said storing means and said storage device responsive to said stored generated signal in the time interval between successive distinct time slots for producing and applying a distinct signal to said storage device, and means for exchanging signals among a plurality of selected storage device circuits in a distinct time slot comprising means for applying said control signal to each selected storage device circuit in said distinct time slot, means responsive to the selected storage device signals applied to said first common bus in said distinct time slot for producing a signal corresponding to the sum of said applied selected storage device signals, and means for applying said produced signal to said second common bus in said distinct time slot.

8. A time division communication system wherein a plurality of time slots occurs in repetitive cycles according to claim 7, wherein said control signal source comprises a control circuit for producing control codes, a plurality of registers each register being connected to one associated circuit and each register comprising means for receiving a control code corresponding to a selected call connection in a distinct time slot from said control circuit, means for storing said control code and means responsive to said stored control code for generating and applying a control signal to said connected circuit in said distinct time slot of each repetitive cycle, and said system further comprising means for identifying an idle time slot including a third common bus, means connected between each register and said third common bus for applying the control signal in each register to said third common bus in the time slot of one repetitive cycle, and means for detecting the nonappearance of any control signal in a particular time slot, and said control circuit further comprising means responsive to the operation of said detecting means for storing a control code designating said particular time slot as an idle time slot.

9. A time division communication system wherein a plurality of time slots occurs in repetitive cycles according to claim 7, wherein said control signal source comprises a control circuit for producing control codes, a plurality of registers, each register being connected to one associated circuit and each register comprising means for receiving a control code corresponding to a selected call connection in a distinct time slot from said control circuit, means for storing said control code and means responsive to said stored control code for generating and applying a control signal to said connected circuit in said distinct time slot of each repetitive cycle, and said system further comprising means for adding a communication path storage device to a selected call connection comprising a third common bus, means for applying the control signal from one already selected associated circuit register to said third common bus in said distinct time slot, means connected to said third common bus for detecting the occurrence of the control signal in said already selected associated register in said distinct time slot, and said control circuit further comprising means responsive to the operation of said detecting means in said distinct time slot for applying a control code to the added communication path storage device associated circuit register in said distinct time slot.

10. A time division communication system wherein a plurality of time slots occurs in repetitive cycles according to claim 7 wherein said storing means comprises second and third stores said signal generating means comprises amplifying means having first and second inputs and first and second outputs, means for applying the signal in said path storage device to said first input, means for applying the signal received from said second bus to said second input, said amplifying means being operative responsive to said control signal to produce a first signal corresponding to said received second bus signal less said path storage device signal on said first output and to produce a second signal corresponding to said path storage device signal less said received second bus signal on said second output, means for applying said first signal to said second store and means for applying said second signal to said third store, and wherein said distinct signal producing and applying means comprises means responsive to said stored first signal for producing and applying a third signal to said path storage device and means responsive to said stored second signal for producing and applying a fourth signal to said path storage device.

11. In a time division communication system wherein a plurality of time slots occurs in repetitive cycles, a circuit according to claim 10 wherein said first signal applying means comprises switching means connected between said first output and said second store responsive to said control signal for connecting said first output to said second store and said second signal applying means comprises switching means connected between said second output and said third store responsive to said control signal for connecting said second output to said third store.

12. In a time division communication system wherein a plurality of time slots occurs in repetitive cycles, a circuit according to claim 11 wherein said third signal producing and applying means comprises first type current generating means and said fourth signal producing and applying means comprises second type current generating means.

13. In a time division communication system wherein a plurality of time slots occurs in repetitive cycles, a circuit according to claim 12 wherein said path storage device comprises a first storage capacitor, said second store comprises a second storage capacitor and said third store comprises a third storage capacitor.

14. In a time division communication system wherein a plurality of time slots occurs in repetitive cycles, a circuit according to claim 13, wherein said first type generating means comprises a positive current generating circuit and said second type generating means comprises a negative current generating circuit.

15. A time division communication system wherein a plurality of time slots occurs in repetitive cycles comprising a plurality of communication paths, first and second common buses and a control signal source, each communication path having an associated circuit coupled to said communication path including a first storage capacitor, means for applying an outgoing signal from the coupled communication path to said first storage capacitor, means responsive to said control signal for applying said stored outgoing signal from said first storage capacitor to said first common bus, means for receiving a signal from said second common bus, a difference amplifier having first and second inputs and first and second outputs, means for applying said received second bus signal to said first input, means for applying said stored outgoing signal to said second input, said difference amplifer being responsive to said control signal to produce a first signal corresponding to said received second bus signal less said stored outgoing signal on said first output and to produce a second signal corresponding to said outgoing signal less said received second bus signal on said second output, second and third storage capacitors, first switching means responsive to said control signal for applying said first signal to said second storage capacitor, second switching means responsive to said control signal for applying said second signal to said third storage capacitor, means connected from said second storage capacitor to said first storage capacitor responsive to said first signal stored in said second storage capacitor for generating and applying a positive current to said first storage capacitor, means connected from said third storage capacitor to said first storage capacitor responsive to the second signal stored in said third storage capacitor for generating and applying a negative current to said first storage capacitor, and means for exchanging signals amoung selected communication path circuits in a distinct time slot comprising means for applying said control signal to each of a plurality of selected communication path circuits in said distinct time slot, and a circuit connected from said first common bus to said second common bus for summing the stored outgoing communication path signals appearing on said first common bus in said distinct time slot and for applying the resultant sum signal to said second common bus.

16. A time division communication system wherein a plurality of time slots occurs in repetitive cycles according to claim 15 wherein each of said first, second and third storage capacitors has first and second terminals, said first switching means comprises a first diode having an anode and a cathode, said first diode anode being connected to the first terminal of said second storage capacitor, said first diode cathode being connected to said first output, said second switching means comprising a transistor having collector, emitter and base electrodes and a second diode having an anode and a cathode, said base electrode being connected to said second output, said collector electrode being connected to the anode of said second diode and the cathode of said second diode being connected to the first terminal of said third storage capacitor.

17. A time division communication system wherein a plurality of time slots occurs in repetitive cycles according to claim 16 wherein each of said positive and negative current generating means has an input and output, said positive generating means input being connected to the first terminal of said second storage capacitor, said negative current generating means input being connected to the first terminal of said third storage capacitor, and the outputs of said positive and negative current generation means being both connected to the first terminal of said first storage capacitor.

18. A time division communication system wherein a plurality of time slots occurs in repetitive cycles according to claim 17 wherein said difference amplifier further comprises a third input and means for applying said control signal to said third input in said distinct time slot, said first and second diodes being rendered conductive in response to the control signal applied to said difference amplifier third input.

19. A time division communication system wherein a plurality of time slots occurs in repetitive cycles according to claim 18 wherein said means for applying the stored outgoing signal to said first common bus comprises bidirectional switching means having first, second and third electrodes and impedance means having first and second terminals, said switching means first electrode being connected to said first storage capacitor first terminal, said switching means third electrode being connected to said impedance means first terminal, means for applying said control signal to said switching means second electrode, and said impedance means second terminal being connected to said first common bus.

* * * * *